(12) United States Patent
Aldrich

(10) Patent No.: US 7,287,385 B2
(45) Date of Patent: Oct. 30, 2007

(54) THERMAL ELECTRIC WITH A CARBON MONOXIDE FILTER

(76) Inventor: Charles H. Aldrich, 1701 Iron St., North Kansas City, MO (US) 64116

( * ) Notice: Subject to any disclaimer, the term of this patent is extended or adjusted under 35 U.S.C. 154(b) by 825 days.

(21) Appl. No.: 10/808,132

(22) Filed: Mar. 24, 2004

(65) Prior Publication Data
US 2004/0191149 A1 Sep. 30, 2004

(51) Int. Cl.
*F25D 21/02* (2006.01)
(52) U.S. Cl. ............................................. 62/3.2; 62/3.6
(58) Field of Classification Search .................. 62/3.2, 62/3.3, 3.5, 3.6, 3.7; 165/65
See application file for complete search history.

(56) References Cited
U.S. PATENT DOCUMENTS 4,177,381 A * 12/1979 McClatchie et al. ........ 250/343
4,708,118 A * 11/1987 Rawlings ..................... 123/555
4,738,147 A * 4/1988 Tomlin ..................... 73/864.81
5,330,723 A 7/1994 Martin et al.
5,426,953 A * 6/1995 Meckler ....................... 62/271
6,430,935 B1 8/2002 Klett et al.

* cited by examiner

*Primary Examiner*—Melvin Jones
(74) *Attorney, Agent, or Firm*—Mark Manley

(57) ABSTRACT

A system for conditioning a flow of inlet fluid such as air by modifying its temperature and by removing particulate matter and carbon monoxide. The system includes Peltier effect thermal electric coolers sandwiched to form air passages to both cool air for use in a space and to expel waste heat. The system includes catalytic alumina pellets impregnated with heavy metals that will remove harmful carbon monoxide from the flow of conditioned air at ambient temperatures.

16 Claims, 2 Drawing Sheets

THERMAL ELECTRIC WITH A CARBON MONOXIDE FILTER

BACKGROUND OF THE INVENTION

In the racing industry safety has become an increasingly important issue. Most drivers now wear helmets and flame proof suits and it is desirable to condition the air drivers breathe. NASCAR™ has identified carbon monoxide, produced by race cars as a significant health risk to its drivers. It is common place in racing for the driver to wear a helmet, and most modern helmets have an air inlet that allows conditioned air to enter the helmet.

U.S. Pat. No. 6,430,935 discloses a personal cooling air filtering device applicable to racing. This device uses machinable carbon foam to create a heat exchanger for a thermal electric cooler. The patent discloses the possible use of a CO filter to remove CO gas but does not give any details on how to achieve a result. The carbon foam heat exchanger appears to be an expensive, bulky and unnecessary approach.

SUMMARY OF THE INVENTION

The present invention relates to a thermal electric cooler used to cool and condition environmental air for a driver. The thermal electric cooler works on the well known Peltier effect where heat is liberated and absorbed at the junction of two dissimilar metals when electricity is applied. The cooler includes a carbon monoxide filter, and dust filter to reduce the driver's exposure to environmental hazards.

The present invention provides a portable, lightweight cooler that uses a minimum of auxiliary energy from the car engine to carry and power. Further advantages of the system will become apparent in the following detailed description of the invention.

The present invention further provides a system for conditioning inlet fluid including a fluid inlet, a first fan for drawing fluid into the inlet; a first filter for removing particulate matter from the inlet fluid and for splitting the flow of fluid into a first portion of fluid and a second portion of fluid; a second fan drawing the first portion of fluid through a carbon monoxide filter; the second fan pushing the first portion of fluid through a first passage, the first passage cooled by a thermal electric cooler. The second portion of fluid flowing through a second passage of the thermal electric cooler where it is heated by waste heat from the thermal electric cooler and the first portion of fluid flowing from an outlet.

The present invention still further provides a method for conditioning an air flow including the steps of providing an inlet air flow, filtering particulate matter from the inlet air flow, splitting the inlet air flow into a first portion of air and a second portion of air;

catalytically filtering carbon monoxide from the first portion of air;

cooling the first portion of air with a thermal electric cooler to provide cooled, filtered air to an outlet.

DETAILED DESCRIPTION OF THE DEVICE

Figure 1:
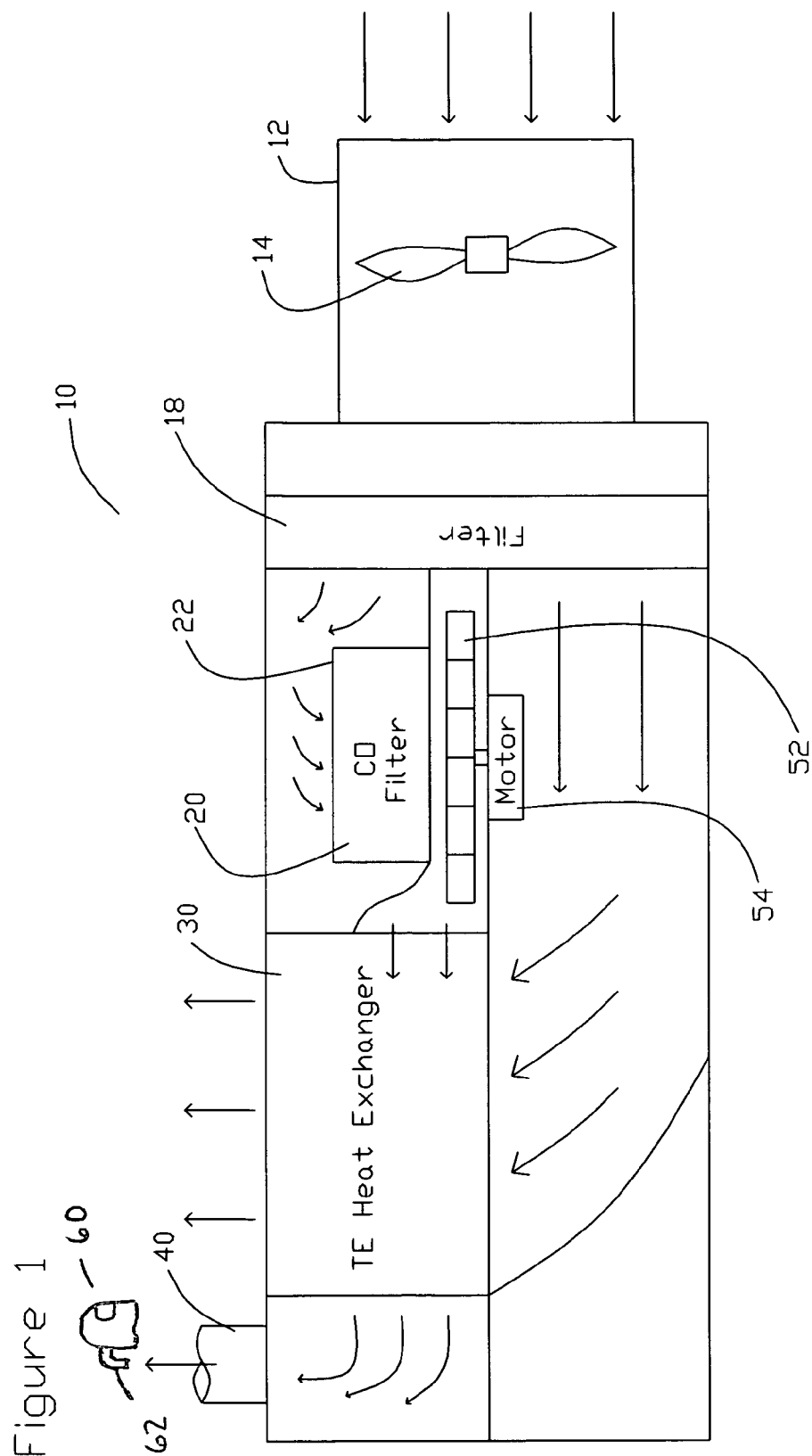
FIG. 1 shows a schematic side view of the cooler system.
Figure 2:
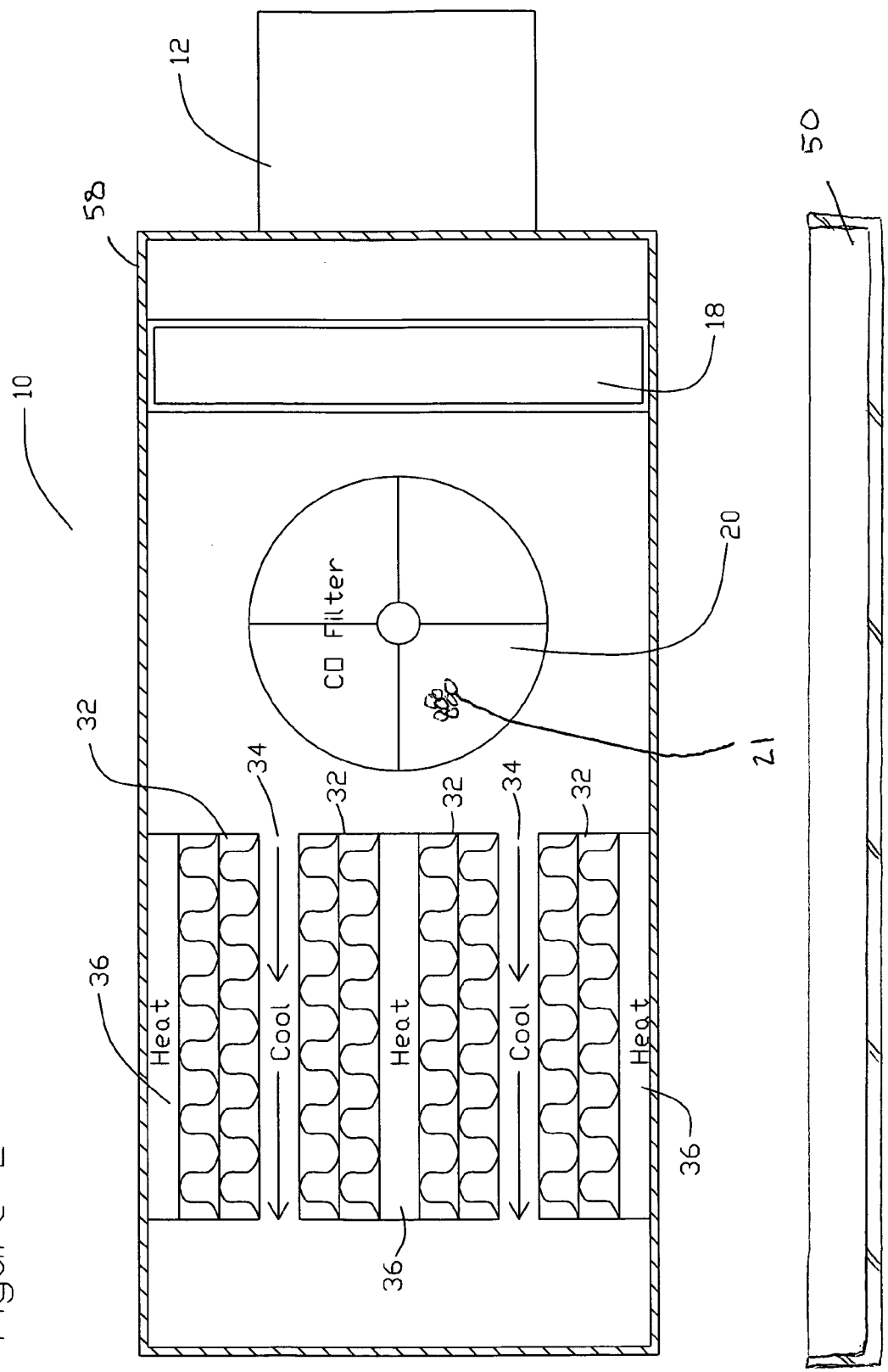
FIG. 2 shows a view from the top of the device.

FIG. 1 shows a schematic view of the system 10 from the side. A flexible inlet hose 12 can connect to the exterior of a conditioned space such as the exterior of a race car (not shown). Inlet air is drawn in through hose 12 by fan 14. The air passes through an initial filter 18, to filter out dust and particulate matter. The inlet air is split into two paths, a first portion of the inlet air flows into Carbon Monoxide filter 20. For this application, the carbon monoxide filter can be of the catalytic type containing pellets 21 of alumina impregnated with heavy metals such as disclosed in U.S. Pat. No. 5,330,723 herein incorporated by reference. These pellets 21 have the advantage of working at ambient temperatures to convert carbon monoxide to carbon dioxide. These pellets 21 can require occasional replacement as they are used, thus the CO filter 20 can come in the form of a replaceable cartridge 22 that allows inlet air to flow through it. The inlet air can be drawn through the carbon monoxide filter 20 by a low profile fan 52 powered by motor 54 and then the inlet air flows through the cool side of a thermal electric cooler 30. The cooled inlet air then flow through an outlet 40 and on to a helmet 60 having a flexible inlet hose 62 or cooled suit or other application not shown. The second portion of air from the inlet hose 12 flows through passage 36 shown in FIG. 2 and up through the warm side of the thermal electric cooler 30 to carry away the heat produced by the cooler 30. The heated air can either be released into the interior of the car not shown or can be ported to the exterior of the car if desired. As shown in FIG. 2, a removable lid 50, shown in cross section, can be attached to the box 58 used to contain the system by any conventional means such as hinges of fasteners not shown. Removal of the lid 50 can allow for the cartridge 22 to be replaced. The cartridge 22 can be recycled by replacing the pellets 21 that have been used with new pellets 21. Box 58 can be portable, a race car driver car have the flexible hose 62 attached to the outlet 40 as they enter the car, the inlet hose 12 can draw air from the interior of the car or can be quick connected to a port not shown to draw air from the exterior of the car. Portability is important as space and weight in race cars is at a premium, portability also allows the driver to place the box 58 where they are comfortable having it. The portable box 58 can receive electrical power from an outlet not shown within said car.

FIG. 2 shows a cross sectional view looking down on the system 10. The thermal electric cooler 30 includes a plurality of thermal electric units 32. Four units 32 are shown, when electricity is applied to the units 32 one side of the unit will heat and the other side will cool. By orienting the units 32 such that cool sides face each other cooling passages 34 can be formed. Air passing through a cool passage 34 will be cooled by a thermal electric cooler unit 32 on each side. In a similar way, the heated sides of the thermal electric units 32 can form passages 36 to carry heated air away from the system 10. In this way, any number of units 32 can be arranged to create a plurality of heated 36 and cooled 34 air passages.

Referring now to FIGS. 1 and 2, in use air is drawn through hose 12 by fan 14. The inlet air then flows through filter 18 to eliminate particulate matter and the flow is then split into a first portion of inlet air that is drawn by fan 52 through CO filter 20. The first portion of inlet air flows through the cooling passages 34 of the thermal electric cooler 30 and through outlet 40 to a conditioned space such as a helmet 60 or environmental suit or electronic instruments or other application not shown. The second portion of inlet air powered by inlet fan 14 flows through the heated passages 36 of the thermal electric cooler 30. This second portion of heated air can then be vented back to the exterior of the space or could be captured and used if needed. A monitor, not shown can be used to sense the amount of Carbon monoxide present at the outlet 40 and this amount could be used to indicate a need to replace cartridge 20. Alternatively the cartridge 20 could simply be replaced on a periodic basis such as after a number of hours of use or after a number of car race miles for example.

Though not shown it would be obvious to reverse the thermal electric units 32 physically or by switching the polarity of electricity supplied to the units so that the first portion of carbon monoxide filtered air was heated instead of being cooled. This would satisfy applications where conditioned and heated air would be needed.

Though not shown it is also well known to use thermostatic controls to sense a temperature or humidity of ambient air, or of the driver or of the outlet air and to control the system based on any or all of these temperatures.

The invention claimed is:

1. A system for conditioning inlet fluid including;
a fluid inlet,
a first fan for drawing fluid into the inlet;
a first filter for removing particulate matter from the inlet fluid and for splitting the flow of fluid into a first portion of fluid and a second portion of fluid;
a second fan drawing said first portion of fluid through a carbon monoxide filter;
said second fan pushing said first portion of fluid through a first passage, said first passage cooled by a thermal electric cooler;
said second portion of fluid flowing through a second passage of said thermal electric cooler where it is heated by waste heat from the thermal electric cooler and said first portion of fluid flowing from an outlet.

2. The system of claim 1 including a helmet receiving fluid flowing from said outlet.

3. The system of claim 1 wherein said carbon monoxide filter includes a removable cartridge.

4. The system of claim 3 wherein the removable cartridge contains pellets of alumina impregnated with heavy metals.

5. The system of claim 3 wherein said carbon monoxide filter is a catalytic filter.

6. The system of claim 1 wherein the fluid is air.

7. The system of claim 1 wherein a portable box contains at least said first fan, said first filter, said carbon monoxide filter and said thermal electric cooler.

8. A system for conditioning an air flow including;
an air inlet providing an inlet air flow,
a first filter for removing particulate matter from the inlet air flow and for splitting the inlet air flow into a first portion of air and a second portion of air;
a carbon monoxide filter;
a first passage, said first passage cooled by a thermal electric cooler;
a second passage of said thermal electric cooler where said second passage is heated by waste heat from the thermal electric cooler and said first portion of air flowing through said carbon monoxide filter and then through said first passage to provide cooled filtered air to an outlet.

9. The system of claim 8 wherein the system includes a portable box containing at least the first filter, the carbon monoxide filter and the thermal electric cooler.

10. The system of claim 9 wherein the box includes a lid, said lid providing access to said carbon monoxide filter.

11. The system of claim 10 wherein the carbon monoxide filter includes a removable cartridge containing pellets of catalytic material.

12. The system of claim 8 wherein the inlet includes a fan powering the flow of inlet air.

13. The system of claim 8 wherein the thermal electric cooler includes at least two thermal electric units oriented with a cooling side facing each other to create said first passage.

14. The system of claim 13 wherein more than one cooling passage is formed.

15. A method for conditioning an air flow including;
providing an inlet air flow,
filtering particulate matter from said inlet air flow,
splitting the inlet air flow into a first portion of air and a second portion of air;
catalytically filtering carbon monoxide from said first portion of air;
cooling said first portion of air with a thermal electric cooler to provide cooled, filtered air to an outlet.

16. The method of claim 15 wherein the thermal electric cooler includes a plurality of thermal electric units and wherein the step of cooling includes flowing said first portion of air through a passage formed between cold faces of two thermal electric units.

* * * * *